(12) United States Patent
Duffy

(10) Patent No.: US 8,734,609 B2
(45) Date of Patent: May 27, 2014

(54) CONTINUOUS PROCESS FOR THE PRODUCTION OF MOISTURE-CURE, POLYURETHANE SEALANTS AND ADHESIVES

(75) Inventor: Sean G. Duffy, Langhorne, PA (US)

(73) Assignee: Bostik, Inc., Wauwatosa, WI (US)

( * ) Notice: Subject to any disclaimer, the term of this patent is extended or adjusted under 35 U.S.C. 154(b) by 105 days.

(21) Appl. No.: 12/343,952

(22) Filed: Dec. 24, 2008

(65) Prior Publication Data

US 2009/0198036 A1     Aug. 6, 2009

Related U.S. Application Data

(60) Provisional application No. 61/017,243, filed on Dec. 28, 2007.

(51) Int. Cl.
*C09J 4/00* (2006.01)
*C09J 101/00* (2006.01)
*C08G 18/10* (2006.01)

(52) U.S. Cl.
USPC .......... 156/331.7; 156/330.9; 156/331.1; 156/331.4; 264/177.17; 264/204; 264/211; 264/211.13; 264/211.18; 264/211.19; 264/331.19; 264/211.23; 264/211.24; 264/236; 264/347; 528/44; 528/59; 528/65; 528/85

(58) Field of Classification Search
USPC ........ 528/44, 59, 65, 85; 264/177.17–177.19, 264/204, 211, 211.13, 211.18–211.2, 264/211.23, 211.24, 236, 331.19, 347, 40.1, 264/40.7; 156/330.9, 331.1, 331.4, 331.7
See application file for complete search history.

(56) References Cited

U.S. PATENT DOCUMENTS

| | | | | |
|---|---|---|---|---|
| 3,642,964 A | * | 2/1972 | Rausch et al. | 264/40.6 |
| 4,250,292 A | * | 2/1981 | Niederdellmann et al. | 528/44 |
| 4,342,847 A | * | 8/1982 | Goyert et al. | 525/66 |
| 5,114,630 A | * | 5/1992 | Newman et al. | 264/3.1 |
| 5,144,005 A | * | 9/1992 | Sextro et al. | 528/480 |
| 5,424,014 A | * | 6/1995 | Glorioso et al. | 264/45.3 |
| 5,621,024 A | * | 4/1997 | Eberhardt et al. | 523/324 |
| 5,695,884 A | * | 12/1997 | Ishimaru et al. | 428/423.1 |

(Continued)

FOREIGN PATENT DOCUMENTS

| | | | |
|---|---|---|---|
| EP | 0708124 | 4/1996 | |
| WO | 91/00304 | 1/1991 | |
| WO | WO 9100304 A1 * | 1/1991 | C08G 18/08 |

OTHER PUBLICATIONS

PCT Search Report, European Patent Office, PCT/US2008/088313, Mar. 30, 2009.

*Primary Examiner* — Michael L Leonard
(74) *Attorney, Agent, or Firm* — Wozny Law, LLC; Thomas M. Wozny

(57) ABSTRACT

A process for continuous manufacturing of moisture-curable polyurethane formulations used as sealants and adhesives. The process is characterized by the fact that the reactive components are introduced independently, and without the need for a prepolymer, to a mixer. Solid or liquid raw materials can be either pre-blended or fed directly to the mixer, a twin-screw extruder, which provides the requisite energy to homogenously mix the raw materials and drive the chemical reaction. The process is designed so that the extruder barrel and screw allow variable feed addition and heat exchange down the length of the machine. This allows various operations to be performed at different points in the extruder, including reaction, dispersive mixing, distributive mixing and devolitization.

9 Claims, 1 Drawing Sheet

(56) References Cited

U.S. PATENT DOCUMENTS

| | | |
|---|---|---|
| 6,534,617 B1* | 3/2003 | Batt et al. .......................... 528/65 |
| 2002/0074681 A1* | 6/2002 | Lundgard et al. ................ 264/78 |
| 2002/0107352 A1* | 8/2002 | Muller et al. .................... 528/51 |
| 2002/0171164 A1* | 11/2002 | Halterbaum et al. ............ 264/53 |
| 2006/0076705 A1* | 4/2006 | Fowler et al. ............. 264/211.23 |
| 2007/0169887 A1* | 7/2007 | Kanagawa et al. ........ 156/331.7 |

* cited by examiner

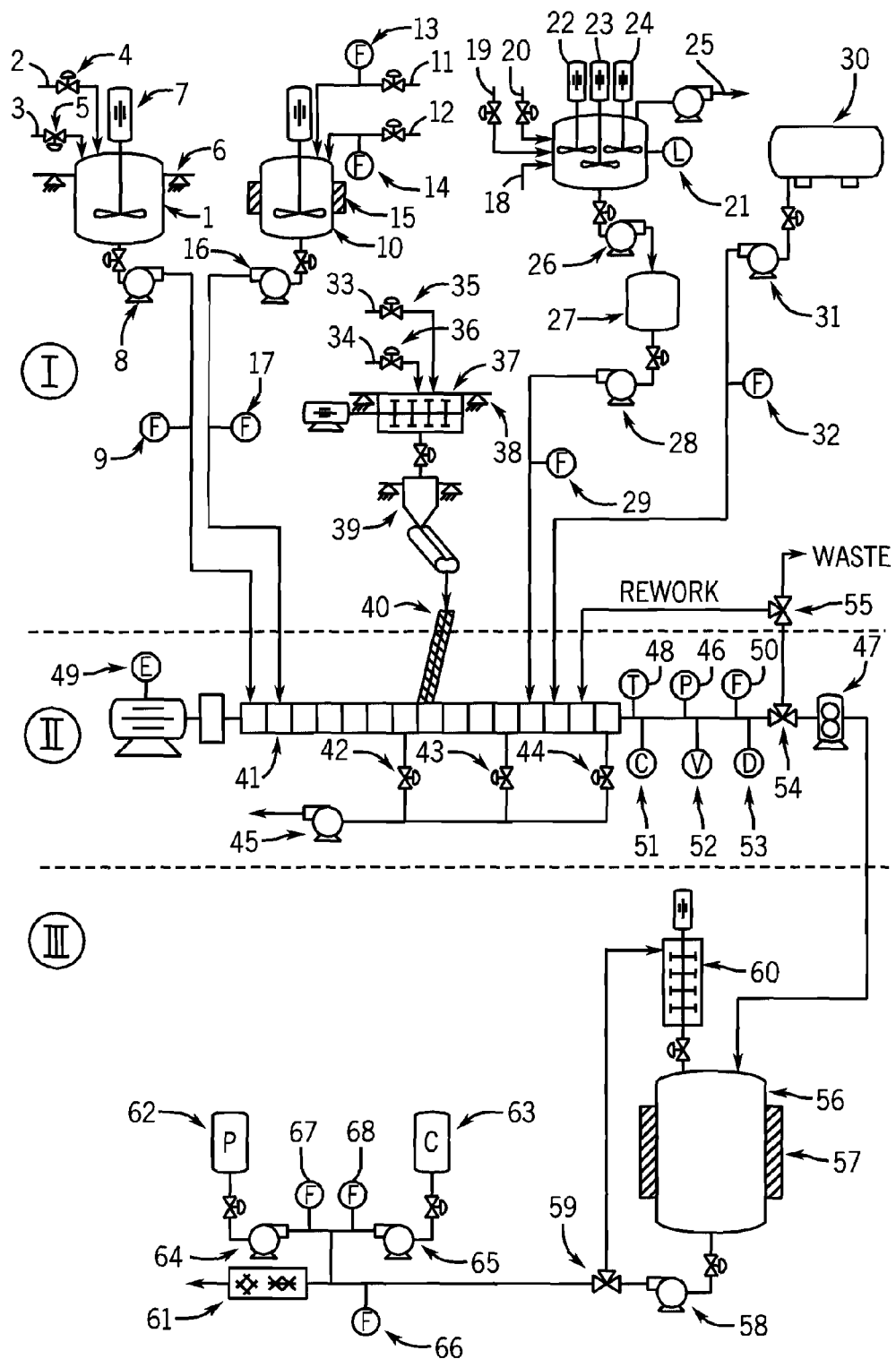

CONTINUOUS PROCESS FOR THE PRODUCTION OF MOISTURE-CURE, POLYURETHANE SEALANTS AND ADHESIVES

CROSS-REFERENCE TO RELATED APPLICATIONS

The present application claims the benefit of priority under 35 U.S.C. §119(e) to U.S. Provisional Application No. 61/017,243 filed on Dec. 28, 2007, the content of which is incorporated herein by reference in its entirety.

BACKGROUND OF THE INVENTION

The present invention relates to a continuous process for production of moisture-curable polyurethane sealants and adhesives. The process is achieved using raw or preblended ingredients fed to a twin-screw extruder, but does not require the additional production resources involved in processing a prepolymer (i.e. pre-mixed reactive components).

Manufacturing polyurethane materials using a continuous process is not novel. The concept is covered in various articles, textbooks and patents. The current literature, however, is limited to processes that either include a pre-polymer manufacturing step (see U.S. Pat. Nos. 5,905,133 and 5,795, 948), have a different polyurethane chemistry than moisture-cure sealants/adhesives with resultant performance characteristics that classify them as thermoplastics, elastomers or foams (see U.S. Pat. Nos. 6,624,278, 6,623,676, 6,040,381, 5,908,701, 4,661,531, 4,250,292, 3,963,679, and 3,642,964) or both (see U.S. Pat. Nos. 6,916,390, 6,294,637, 5,905,133, 5,795,948, 5,037,864, 4,879,322, 4,857,565, 4,742,095, and 4,342,847). The novelty of the proposed process lies in the use of a single machine to mix and react the moisture-curing formulation in-situ.

Polyurethanes are formed through the reaction of a multi-functional (functionality >1.0) polyol (—OH) with a multi-functional (functionality >1.0) isocyanate (—NCO). There are many applications and types of polyurethanes (elastomer, foam, thermoplastic, etc.), but this invention relates particularly to polyurethanes used as sealants and adhesives. In these formulations, the NCO/OH molar ratio can range from 1.5 to 3.0 in order to achieve the proper performance characteristics and maintain their liquid and/or thermoplastic state. In addition to these reactive components, most polyurethane adhesive formulations utilize ingredients that include but are not limited to fillers, tackifiers, plasticizers, antioxidants, catalysts, desiccants, pigments and viscosity modifiers.

The most common manufacturing method for polyurethane sealants and adhesives is to charge the raw materials, either manually or through an automated handling system, into a high-intensity batch mixer. Often a two-step or moisture-curable prepolymer approach is used. In the first step the polyol and isocyanate are pre-mixed in the desired ratio, possibly with several other ingredients, to form the prepolymer. In the second step this prepolymer is mixed with the remaining raw materials to achieve the final formulation. The prepolymer is typically formulated so that it can be used in several different finished products. As a result, while both production steps may occur in the same mixer, often a large quantity of the prepolymer is manufactured in the mixer for the first step then transferred to one or more secondary mixers to make several finished batches.

As an alternative to the prepolymer process, a one-step manufacturing approach may also be used. In the one-step approach, all of the raw materials are sequentially charged (again, either manually or through an automated raw material handling system) to a single, high-intensity batch mixer. In this approach the order of addition of the ingredients is important in order control the finished product quality. Once the product is complete it is transferred directly to the final packaging form and there is no need for a secondary mixing step.

While efficient mixing of the raw materials through energy transfer from the mixer is a primary requirement for adequate product quality, there are several other important process requirements for these formulations. Since the final product is moisture-curable, control of water in the process is critical. Moisture finds its way into the product either as a natural part of the raw materials as provided from the supplier or through exposure to environmental conditions, such as absorption of the moisture from humid air into the raw materials and/or finished product. For this reason, vacuum and/or chemical desiccation are used to remove excess moisture in the product and prevent premature curing in the packaging container. The application of vacuum in the mixing process is also used to remove the carbon dioxide gas, which is a natural by-product of the water and Isocyanate reaction.

Process temperature is another important control variable in manufacturing these materials. In either the single or two-step approach product temperatures can run from 125° F. to 250° F. depending on the nature of the raw materials and their thermal stability. These temperatures are selected to drive the urethane reaction (with or without the presence of a catalyst) and/or promote mixing depending on the stage of the process. High shear mixing blades are frequently used, which add heat to the process. Batch temperature is typically maintained by means of a heating and/or cooling medium (oil, water, etc.) that is circulated through an internal or external enclosure on the mixing vessel (coil, jacket, etc.) to add or remove heat depending on the process requirements.

Typical commercial process times depend on variables such as the formulation, raw material feed rates, scale of the equipment, manpower limitations, and heat transfer capabilities. In the two-step approach, standard batch times for each step can range from 2 to 6 hours. In a one-step approach, batch times may run between 4 to 12 hours.

Once the mixing process is complete the fully formulated product is transferred to the packaging line. To package the product, pressure is applied that allows the material to be injected into the container (typically cartridges, sausage-packs/chubs, pails or drums) for delivery to the customer.

The complexity of the polyurethane formulations and process make the batch manufacturing approach outlined above inefficient and undesirable. Several factors combine that cause the process to be labor and/or capital intensive:

a. The number of raw materials in the formulation and the limitations related to their order of addition requires a significant amount of automated material handling equipment or dedicated labor to manually charge the ingredients. When labor is used to fill this need, undesirable safety issues may be introduced such as operator exposure to chemical and/or ergonomic hazards. In some cases, manufacturers use a combination of automated equipment and labor to process the materials, depending on the nature of the raw material supply (bulk vs. non-bulk).

b. Product quality requirements often necessitate in-process quality testing to ensure critical product parameters, including but not limited to moisture content, are within specifications to proceed to the next process step. This is accomplished either through on-line instrumentation or by manually sampling the batch in the middle of the process. The former requires a high degree of capital investment and sophistication. The latter involves batch delays as samples are taken by the operator and brought to plant's QC laboratory for evaluation.

c. By their nature, moisture-curable polyurethanes quickly and easily build up and cure on equipment surfaces, particularly once the product is transferred and machinery is exposed to the moisture in the ambient air. Keeping equipment surfaces clean is a constant battle and cleaning must occur on a regular basis either to prevent contamination (for example from a cured piece of polyurethane coming loose in a subsequent batch or in the case of a product color change) or maintain equipment performance (such as keeping agitator blades clean for sufficient mixing). As a result, a fair amount of time and energy is often invested in cleaning the equipment. This is not only an issue in terms of the operator time invested in cleaning, but also creates the undesirable environmental and economic consequences related to solvent disposal.

In addition to the negative cost impact of the factors outlined above, there are additional productivity limitations associated with the batch process that further affect the manufacturing economics. These include but are not limited to:

a. The low surface area/volume ratio present in batch mixers. As the size/scale of batch mixers increases, there is more volume of the product in the mixer and less surface area (per unit volume) that is in contact with the walls (for heat transfer) or the exposed to the vacuum in the headspace (for mass transfer of moisture and/or carbon dioxide as outlined above). Since heat and mass are only transferred at these interfaces, the poor surface area/volume ratio in batch mixers will adversely affect batch times. The result is lower throughput and higher manufacturing costs per pound for the finished product.

b. In-process testing. If on-line instruments are not installed, the equipment must be shut down occasionally to check the quality. Idle time on the equipment while the sample is taken, brought to the lab and evaluated reduces the production capacity for the equipment.

c. Equipment cleaning. As outlined above, manufacturing moisture-curable sealants and adhesives requires frequent equipment cleaning. Since the equipment sits idle whenever it is being cleaned, this further reduces the production capacity and increases manufacturing costs.

These limitations combine to make the batch process unattractive from a capital or operational cost perspective, and possibly both. There are significant economic, safety, environmental and productivity gains that can be realized from an alternative production method that addresses the concerns outlined above.

SUMMARY OF THE INVENTION

The present invention provides a continuous manufacturing process to replace the batch mixing approach outlined above. In particular, the invention provides a means for producing the sealants and adhesives without the additional process step of making a prepolymer. As a result, the invention significantly improves on the current batch process and addresses nearly all of the concerns outlined above to dramatically improve not only the manufacturing economics, but the personnel safety, product quality and process control.

The invention discloses the use of a twin-screw extruder as the preferred process apparatus. The twin-screw extruder is the preferred mixing vehicle for the product, characterized by its modular design, which allows the screw to be configured in a virtually unlimited number of configurations. This allows the machine to conduct a variety of operations on the material as it moves down the barrel length, transferring energy from the twin screws to homogenously mix the materials and drive the reaction. The machine also provides a much higher surface area-to-volume ratio than a batch mixer, allowing for much more efficient heat transfer to control the material temperature and mass transfer to devolitalize the product. In addition, the combination of a small processing volume and the self-wiping effect of the twin screws minimizes the need for cleaning the equipment for product changes or shutdowns.

Upstream of the extruder the invention makes use of pumps and feeders to meter the raw materials to the twin-screw extruder. In some cases the materials are pre-blended to simplify the process and reduce the number of feeders needed.

Downstream of the mixer a flow control mechanism such as a gear pump is used to maintain a constant fill level in the twin-screw extruder. This assures a constant energy input to the raw materials for consistent product quality at the discharge. Downstream of the flow control device the product may be stored prior to packaging. The use of an optional thin-film evaporator is also disclosed. Depending on product performance requirements, the higher surface-to-area volume ratio associated with the thin-film evaporator can further improve the degassing efficiency of the process relative to the batch approach. Finally, the use of a static mixer is disclosed that may be added at the packaging line to add pigments and/or catalyst to the product. Adding these ingredients at the end of the process provides additional advantages particularly for cleaning requirements since (a) color changes do not affect most of the equipment and (b) the material is much less reactive with moisture and/or itself prior to catalyst addition, so the risk of material building up and curing on equipment surfaces is significantly reduced.

Proper operation of the equipment is maintained by instruments that monitor the throughput, temperature and other parameters to maintain the specified flow of material to the twin-screw and energy transfer to the product. Preferably these devices are tied into a centralized control system that monitors all components and adjust flow rates, valve positions, pump speeds and other independent variables with minimum need for operator intervention. This limits the manpower required to operate the line, significantly improving the fixed costs of the process. This automated approach also dramatically reduces operator exposure to the chemical and ergonomic hazards associated with the batch process.

BRIEF DESCRIPTION OF THE DRAWING

FIG. 1 is a schematic flow diagram illustrating the various components utilized in the invention.

DETAILED DESCRIPTION OF THE INVENTION

FIG. 1 provides a flow diagram of the continuous process. This FIGURE represents one possible embodiment of the invention, and the specific equipment configuration will depend on the product formulation, raw material requirements and performance specifications. An outline of the design considerations is given below.

FIG. 1 starts with the raw material handling systems at the top of the FIGURE, labeled as Section I. Various design alternatives are presented in the flow diagram for handling both the liquid and solid ingredients typically found in sealant and adhesive formulations. In vessel 1, for example, raw materials 2 and 3 are introduced through control valves 4 and 5, respectively. In this case the load cells 6 on the tank control the amount of each raw material introduced to the process by monitoring the gain in weight in preblender 1 and closing valves 4 and 5 respectively once the proper weights are achieved. Alternatively the load cells may be located on raw material storage vessels upstream of valves 4 and 5 (not shown in FIG. 1). In this case the load cells would monitor the loss-in-weight from these raw material containers to accurately meter the ingredients to preblender 1. An agitator 7 is used to homogenize the raw materials. The combination of a variable-speed metering pump 8 with a flow meter 9 controls the flow rate of this preblend to the twin-screw extruder 41 shown in Section II of FIG. 1.

Another design for raw material preblending is shown in preblender 10. In this instance, precise metering of raw materials 11 and 12 is controlled using flow meters 13 and 14, respectively. As with the load cells on vessel 1, the flowmeters 13 and 14 used in this design may be located upstream of the control valves. The raw materials used in preblender 10 require some temperature control, so a heat transfer jacket 15 is included on the tank. Heating coils internal to the vessel may also be used in place of the external jacket shown in FIG. 1. Again an agitator 16 maintains uniformity of the preblend as it is fed to the mixer 41 using a variable-speed metering pump 16 combined with a flow meter 17.

Yet another approach to preblending is to utilize multiple high-intensity agitators as shown on preblender 18. Here raw materials 19 and 20 are introduced to the vessel, which uses a level indicator 21 to accurately meter the ingredients. As with the previous preblenders, the level indicator(s) may be on the upstream raw material containers and monitor the inventory reduction in these containers to meter the materials rather than the level increase as shown in FIG. 1. Three agitators 22, 23, and 24, one or more of which may be a high speed, disperser-type agitator, are used to homogenize the raw materials. A vacuum pump 25 may also be attached to minimize the amount of moisture or other unwanted volatiles in the preblend before the reactive components are combined in the twin-screw extruder 41. Once the preblend is homogenous, pump 26 is used to transfer the preblend to a secondary holding tank 27. A metering pump 28 with a flow meter 29 then controls the flow rate to the twin-screw extruder 41.

The final liquid vessel 30 represents the simplest feed approach for the continuous process. In this case a single raw material is fed directly to the twin-screw extruder 41 without any preblending. A metering pump 31 is connected directly to vessel 30 (which may be a bulk storage tank or intermediate container provided by the supplier such as a drum or tote) and uses a flow meter 32 to accurately dose the liquid to the mixer 41.

It is important to note that any combination of the handling and control alternatives outlined (flowmeters vs. load cells, heat transfer jacket vs. no jacket, high-intensity vs. low-intensity agitation, etc.) may be implemented for a given preblend. Selection of the proper design is based on the chemical and engineering requirements for the raw materials and/or the finished preblend in question. The specific combinations shown in FIG. 1 are illustrative only and intended to show the variety of options available that will work with the invention. It is also important to note that any of the liquid vessels outlined above may have more than two raw materials introduced for preblending. Two ingredients are used for all of the examples in FIG. 1 for simplicity only.

In addition to liquid raw materials, it may also be necessary to introduce solid ingredients to the mixer 41. FIG. 1 shows the case where two ingredients 33 and 34 are needed. They are introduced through control valves 35 and 36 to a preblender 37, which is situated on load cells 38 to control the amount of each raw material in the preblender 37. Once the ingredients are adequately blended, they are discharged into a solids feeder 39 that uses either gravimetric (as shown in FIG. 1) or volumetric calculations to accurately meter material to a crammer feeder 40. This crammer feeder then pushes the solids into the twin-screw extruder 41. Several alternatives to the powder mixing process presented in FIG. 1 may be installed to achieve the same final result. More than two ingredients may be mixed in preblender 37, or a single, unblended solid may be used. In the latter case the preblender is no longer necessary and the material will flow from a supply vessel (bulk tank, supersack, etc., not shown in FIG. 1) either directly to feeder 39 or to an intermediate holding tank (not shown in FIG. 1) that supplies feeder 39. As outlined for the liquid preblenders, the load cells (or other flow monitoring devices) may be installed on the supply containers (not shown in FIG. 1) for raw materials 33 and 34, located upstream of control valves 35 and 36. Any type of powder blender may be used in the process (including but not limited to ribbon blenders, double-cone blenders, and V-blenders) with selection based on the characteristics of the individual ingredients being blended as well as the preblend itself. Finally, in some instances one or more of the raw materials used in this process may be a liquid. If this is the case, they are introduced at a low level (typically <5% of the preblend).

Having outlined the feed configurations we now move to Section II of FIG. 1, where the mixing takes place. The modular design of the twin-screw extruder 41 both in terms of the screws and the barrel allows the machine to accomplish different tasks at different points along the length of the machine, yielding significant process flexibility. In the case of sealants and adhesives a machine length of 48 to 60 D (or 48 to 60 L/D where L is the machine length and D is the screw diameter) is needed to properly stage addition of all of the raw materials and adequately achieve the requirements of the process, i.e. mixing, reaction and devolitization, prior to discharge from the machine. The preblend that includes the hydroxyl group is mixed with either a direct-fed Isocyanate or an Isocyanate preblend early in the mixer, represented in FIG. 1 by the feeds from preblenders 1 and 10. Up to half of the mixer length is then used to homogeneously mix and react these two components (hereafter referred to as the "primary reaction zone"). The screw configuration in the primary reaction zone is made up of conveying elements in the feed sections, followed by combinations of dispersive and distributive mixing elements. A limited number of conveying elements may also be included to break up and re-orient the flow. Heat is typically added on these barrel sections to maintain a process temperature in the range of 120-220° F.

Solid ingredients may be added at any point along the mixer length. The point of addition will vary depending on the formulation and functionality of the solid ingredients, but they are typically introduced to the twin-screw extruder at the end of the primary reaction zone, represented in FIG. 1 by the crammer feeder 40. The barrel in this area is typically run neutral, i.e. without heating or cooling. High-capacity conveying elements are used on the screw in this region, followed by mixing elements. The intensity of the mixing elements immediately following this feed area is highly dependent on the nature of the ingredients added. Low-intensity elements are installed for raw materials that are shear and/or temperature sensitive, such as PVC. Ingredients that require significant dispersive or distributive mixing, however, will benefit from more intensive kneading blocks in this area. This relatively short mixing length is followed by a series of alternating conveying and mixing elements to accommodate the remaining feed streams (represented in FIG. 1 from preblender 27 and vessel 30) introduced before the discharge of the machine. Chilled water is typically run through the barrels downstream of the crammer 40 in order to reduce the temperature of the product prior to storage and packaging. The target discharge temperature from the mixer is below 130° F. in order to maintain product stability.

In order to minimize unwanted gases (air, water vapor, carbon dioxide, etc.) in the product, vacuum is applied at several locations along the mixer length. These level of vacuum at each of these vent ports is established by use of control valves 42, 43 and 44. The screw configuration both upstream and downstream of the vent ports is designed to restrict the flow of material as much possible and form a "melt seal" with the product that will allow as deep a vacuum pressure as possible. Under each vent port, however, conveying elements are used in order to spread out the product, thus increasing surface renewal and creating a more favorable surface area-to-volume ratio for effective devolitization. Vent port 42 may have vacuum pressure applied if there are no solids being fed through the crammer feeder 40. If there is a solid introduced by crammer feeder 40, however, vacuum is typically not applied to vent port 42 and it is instead kept at ambient pressure to vent the gas naturally entrained in the solid feed stream from the crammer 40. The location and efficiency of vent port 44 is of particular importance as this is the last opportunity to remove the gas before the material is transferred to the downstream packaging equipment. Vent port 44 is therefore installed as close to the discharge of the mixer 41 as practical. The screw configuration both upstream and downstream of this vent port is designed to create as effective a melt seal as possible in order to maximize the depth of vacuum prior to mixer discharge. Increasing vacuum in this way also increases the product density by degassing the product. As shown in FIG. 1, each of these vacuum ports may be tied into a single vacuum pump 45 through a manifold.

Proper design of the vent port is critical to process stability. Since the sealant and adhesive formulations are much less viscous than the polymers typically processed on twin-screw extruders, the product can very easily be pulled up the vent port and possibly back to the vacuum pump even at moderately low vacuum levels. The use of an expanded vent port or "vent tower" can help reduce the gas velocity and prevent material from getting lifted off of the screws and potentially damaging the vacuum pump 45.

Instrumentation installed at the discharge of the machine is critical in monitoring and maintaining the quality of the sealant and adhesive formulations. In addition to hydraulically filling the screw downstream of the last vent port 44 to prevent gas from getting whipped into the product, a series of instruments can be installed to provide critical feedback data to the operator(s) in order to control the process. A pressure instrument 46 is used in conjunction with a flow control device—a variable-speed gear pump 47 in the case of FIG. 1—on the discharge of the mixer 41 to control the fill level in the mixer. In this example, a control system adjusts the speed of the gear pump 47 to maintain a constant mixer discharge pressure/gear pump suction pressure as indicated by the pressure gauge 46. This pressure is directly related to the fill level in the machine and, when maintained within a tight operating window, should provide for a stable energy input and consistent product quality. The stability of the energy input can be further evaluated through the data from a temperature sensor 48 and motor power draw monitor 49.

An important consideration in this process is proper balancing of the production rate and screw speed. Since the twin-screw extruder typically does not run full along the length of the machine, gas pockets can be whipped into the product if the screws run too fast. This can yield material at the discharge that is not only low in density, but could cure prematurely due to any moisture present in the entrapped air, regardless of the level of vacuum achieved in the mixer. Screw speeds may range anywhere from 100 to 1200 rpm depending on the product and throughput, with 600 rpm a typical value.

Since the materials processed are moisture-curable it is important to minimize the potential for water to get into the machine. This is particularly important during shutdowns since the equipment is typically emptied, which increases the risk for cured material that can damage the motor and/or shaft on restart. To address this problem a solvent, plasticizer or other compatible liquid may be introduced into the mixer at the furthest upstream feed port when the machine is shut down. This approach has been shown to effectively keep the screws clean and prevent any residual material in the machine from curing so that no problems are encountered when restarting the equipment. A nitrogen blanket may also be placed to the mixer or other storage and transfer equipment to further mitigate the risk of product curing on the surfaces. Solvents may also be added to the mixer barrel to help clean the screw before removal.

Additional instruments may be installed downstream of the twin-screw extruder 41 to further enhance the process feedback. A flowmeter 50 can be used to confirm that the flow into the mixer 41 matches the flow out. On-line analytical instruments may also be used to minimize the need for collecting routine samples for QC lab analysis. These instruments include concentration monitors 51, viscometers 52 and density meters 53. The information provided by these instruments can be used to monitor and trend the process. By setting upper and lower limits on the measurements, material can be automatically diverted to either a waste or rework stream via pair of three-way valves 54 and 55.

Once the material is determined to be within specifications, optionally a pump 47 will transfer material to the downstream packaging equipment shown in Section III of FIG. 1. This area of the process may include one or more storage tanks 56 to minimize the interdependence of the mixing and packaging processes and improve the overall reliability of the system. A metering pump 58 may be used to transfer the product from the storage tank 56. A three-way valve 59 can be used to control the flow of the product either back to the tank 56 or to the packaging line. If material is re-circulating back into the tank 56, a thin-film evaporator 60 may optionally be included for additional gas removal from the product. When the packaging line is ready to receive material, the three-way valve 59 will actuate and send the product to the final packaging container, optionally though a static mixer 61. Just upstream of the static mixer the product may be combined with one or more functional additives. These additives are introduced downstream of the mixer in order to simplify the process in the twin-screw extruder and improve the economics of the invention. In FIG. 1, these are shown as pigment and catalyst feed streams, fed from individual vessels (62 and 63, respectively) and metering pumps (64 and 65, respectively). The proper ratio of the product and additives is controlled through use of flow control instruments 66, 67 and 68, although other control mechanisms as outlined above may be used. The materials flow together and are homogenized in the static mixer prior to discharge into the packaging container, typically a cartridge, sausage pack/chub or pail.

Hardwood Flooring Installation Adhesive:

The method and apparatus of the present invention is adaptable to the production of many formulations of moisture-curing polyurethane adhesives for installing hardwood flooring. These adhesives comprise a blend of isocyanates, polyetherpolyols, tackifying resin, plasticizer, fillers, solvents, adhesion promoters, fungicide, moisture scavengers, antioxidants, pigments and catalyst.

The ingredients used to manufacture these polyurethane adhesives are well known in the literature and can be found for example in U.S. Pat. No. 5,905,133. The isocyanate containing monomers are typically difunctional isocyanates and can be either aliphatic or aromatic. Examples include aliphatic diisocyanates, such as hexamethylene diisocyanate and cycloaliphatic diisocyanates, such as isophorone diisocyanate.

More preferred isocyanates are those that are aromatic, such as TDI (toluene diisocyanate) and MDI (diphenylmethane diisocyanate). The isocyanates can be monomeric or polymeric and otherwise modified. Examples of monomeric isocyanates include Mondur M (diphenylmethane 4,4'-diisocyanate), Mondur ML (mixture of 4,4' and 2,4' diphenylmethane diisocyanate) and Mondur MA 2902 (allophanate-modified 4,4'-diphenylmethane diisocyanate). Examples of polymeric isocyanate include Desmodur XP 2619 which is an aromatic isocyanate based on diphenylmethane diisocyanate. All of these materials are commercially available from Bayer Material Science.

These compounds may be used alone or in combination, from amounts ranging from 2 to 10 percent by weight, preferably between 3 to 4 percent by weight, to achieve reactive isocyanate content from 0.3 to about 1.7 percent by weight, by reacting in situ or "one shot" during the process of manufacture with the liquid polyetherpolyols mentioned in the next section.

The hydroxyl containing materials used to produce polyurethanes are also widely known in the literature. They are polyols that contain two or more hydroxyl groups and can be aliphatic or aromatic. Commonly used polyols are typically described as being either polyester or polyether. The polyether polyols are preferred for use in this invention and can vary in molecular weight from less than 300 to as much as 6000.

It is particularly preferred that one or more liquid polyetherpolyols be utilized. Preferably the polyetherpolyol includes a propylene oxide end capped triol or diol. It is also preferred that the propylene oxide end capped triol preferably have a weight average molecular weight of from about 4000 to 4500 and the propylene oxide end capped diol have a weight average molecular weight from 1900 to 2200. These compounds can be used in combination or alone, in the amounts ranging from 3 to 20 percent by weight.

Commercial products include Arcol LHT42 triol, which is a 4200 molecular weight polypropylene oxide based triol and Arcol PPG-2000, which is a 2000 molecular weight polypropylene glycol. Both of these materials are available from Bayer Material Science.

The hardwood adhesive may contain a tackifying resin which can be derived from the polymerization of a C9 petroleum fraction. Preferably the softening point of this tackifying resin ranges from 90 to 110° C. The tackifying resin is preferably from about 1 to about 15 percent by weight, more preferably from 7 to 12 percent by weight of the formulation. Commercial products include Norsolene S95 from Sartomer, NovaresTT S90 from Rutgers Chemicals and Nevchem 100 from Neville chemical.

In the practice of this invention, there may be various additives commonly known in the art which include plasticizers, fillers, thixotropic agents, solvents, adhesion promoters, fungicides, catalysts, moisture scavengers, antioxidants and defoamers.

Typical plasticizers are derivatives of benzoic acid or phthalic acid (phthalates, such as dibutyl, dioctyl, dicyclohexyl, diisooctyl, dibenzyl or butylbenzyl phthalate). Also used are terephthalates, preferably di(2-ethylhexyl)terephthalate (DEHT), or dioctyl terephthalate (DOTP), commercially known as Eastman 168. Other types include 1,2-cyclohexane dicarboxylic acid diisononyl ester, commercially known as Hexamoll DINCH.

Typical fillers include talc, calcium carbonate, clay, silica, mica, wollastonite, feldspar, aluminum silicate, alumina, hydrated alumina, glass microspheres, ceramic microspheres, thermoplastic microspheres and baryte. The fillers can have a wide variety of particles sizes and can be coated or non-coated. Particularly preferred are coated and uncoated calcium carbonates, which can be either ground or precipitated.

Suitable thixotropic agents typically fumed and precipitated silica. Particularly preferred is a silane-treated fumed silica which is available as Cabosil TS 720 from Cabot.

Suitable solvents include heavy alkylate naphtha, isoparaffinic solvents, preferably odorless mineral spirits. Also preferred is propylene carbonate.

Suitable adhesion promoters include silane containing compounds, which may additionally contain at least one reactive group, such as epoxy, isocyanate, amine groups and preferably comprise epoxy reactive groups. Such a material is commercially known as Silquest A187 from Momentive Performance Materials and Dynasylan Glymo from Evonik Industries.

Fungicide compounds include N-(Trichloromethylthio) phthalimide, commercially known as Fungitrol 11 from International Specialty Products.

Moisture scavenger compounds include calcium oxide, molecular sieves and para-toluenesulfonyl isocyanate. The latter is preferred and is available as PTSI from VanDeMark.

Various catalysts are also widely known in the art. A preferred catalyst includes dibutyltin dilaurate.

Useful antioxidant compounds consist of pentaerythritol tetrakis 3-(3',5'-di-tert-butyl-4'-hydroxyphenyl propionate) available as Irganox 1010 from Ciba. Another antioxidant is thiodiethylene bis 3-(3,5-di-ter-butyl-4-hydroxyphenyl)propionate, referred to as Irganox 1035 from Ciba.

Preferably these components are present in the following ranges:

At least one plasticizer in the amount from 7 to 25 percent by weight.

At least one filler, preferably in an amount from 25 to 70 percent by weight and more preferably in the amount of 50 to 70 percent by weight.

At least one thixotropic agent, especially silane-treated fumed silica, preferably in an amount from 1 to 5 percent by weight.

At least one solvent, especially odorless mineral spirits, preferably in an amount from 3 to 15 percent by weight.

At least one additive like adhesion promoter, fungicide, pigments, catalyst, moisture scavenger, antioxidant, preferably in the amount from about 0.01 to about 5 percent by weight.

In the following examples, polyurethane formulations 1 and 2 are produced using the currently used one-step batch process and the inventive process using a twin-screw extruder. The two formulations are similar and are broadly described below. They are for illustrative purposes only and are shown to give an idea of a typical polyurethane formulation. The differences between formulations 1 and 2 are only in the relative amounts and chemistry of the various raw materials. They do not represent the broad range of formulations, either in terms of percentages or of the raw materials that can be processed using a twin-screw extruder and should not be used to limit the scope of the patent.

| Hardwood Flooring Installation Adhesive Formulations 1 and 2 | |
| --- | --- |
| Raw Material | Amount by weight |
| Polyether polyol (Arcol PPG-2000 or LHT-42) | 12 to 15% |
| Monomeric MDI (Mondur M or ML) | 3 to 4% |
| Tackifying resin (Norsolene S95) | 7 to 12% |
| Plasticizer (dioctyl phthalate) | 12 to 20% |
| Filler (calcium carbonate) | 50 to 60% |
| Thixotropic agent (Cabosil TS 720) | 2 to 4% |
| Solvent (odorless mineral spirits) | 7 to 11% |
| Catalyst (dibutyltin dilaurate) | 0.1 to 1.0% |
| Adhesion promoter (Silquest A-187) | 0.1 to 1.0% |

EXAMPLE 1

Polyurethane adhesive formulation 1 is produced using one-step prior art batch manufacturing process outlined previously. Plasticizers, polyols, fillers and other functional additives are charged into a high-intensity mixer to uniformly mix and disperse the ingredients. Vacuum is applied to the mixer to remove any residual moisture that may be introduced with the raw materials. Once this non-reactive pre-mix is below the defined moisture specification, the isocyanate, catalyst and other functional ingredients are then added to the mixer. The product is maintained at a target temperature of 160° F. for four hours to complete the reaction. Table 1 summarizes the process conditions and performance characteristics of the resultant product:

TABLE 1

| Parameter | Value |
| --- | --- |
| Reaction temperature | 160° F. |
| Viscosity | 152,000 Cps |
| Tensile strength[1] | 111 psi |
| Elongation[1] | 401% |
| Modulus[1] | 85 psi |
| Shore A hardness[1] | 46 |
| Lap shear strength[1] | 112 psi |

[1]All samples for mechanical testing were aged one week at room temperature

EXAMPLE 2

Polyurethane adhesive formulation 1 is produced using a continuous process in accordance with the present invention on a twin-screw extruder by feeding the polyol preblend into the first barrel section of the mixer, followed immediately thereafter (within four screw diameters) by the isocyanate(s). These two ingredients are mixed slightly while they are transported downstream using conveying elements. Within six screw diameters a preblend including a fraction of the catalyst is introduced to help drive the reaction in the first zone of the mixer. Shortly after the addition of the catalyst preblend, an alternating series of mixing and conveying elements are used to promote intimate mixing between the polyol, isocyanate and catalyst groups and promote the urethane reaction. This mixing continues for between 10 to 20 screw diameters and ends with the introduction of an additive preblend (in this case consisting of a chemical desiccant, viscosity modifier and adhesion promoter). Conveying and mixing elements are again used to homogenize this material over a length of between 3 to 10 screw diameters. At this point the first vacuum port is employed for devolitization. The first vacuum port is followed by intensive mixing elements over a length of between 3 to 10 screw diameters before a second vacuum port is used for additional devolitization. The second vacuum port is followed by 3 to 10 screw diameters of mixing elements before a preblend containing the remaining amount of catalyst is introduced. The screw configuration over the remainder of the mixing length (between 10 and 20 diameters) consists primarily of mixing elements prior to the discharge of the machine. Table 2 summarizes the process conditions and performance characteristics of the resultant product. Evaluation against the control data presented in Table 1 confirms comparable results across all performance measures.

TABLE 2

| Parameter | Value |
| --- | --- |
| Polyol feed location | 1 to 3 D |
| Isocyanate feed location | 3 to 7 D |
| Catalyst preblend 1 feed location | 6 to 13 D |
| Additive feed location | 16 to 30 D |
| Catalyst preblend 2 feed location | 25 to 45 D |
| Screw diameter | 50 mm |
| Screw L/D | 50 |
| Screw speed | 400 rpm |
| Throughput | 300 lb/hr |
| Upstream barrel temperature | 160° F. |
| Viscosity | 287,000 Cps |
| Tensile strength[1] | 136 psi |
| Elongation[1] | 484% |
| Modulus[1] | 81 psi |
| Shore A hardness[1] | 45 |
| Lap shear strength[1] | 100 psi |

[1]All samples for mechanical testing were aged one week at room temperature

EXAMPLE 3

Polyurethane adhesive formulation 2 is produced using one-step batch manufacturing process outlined previously. Plasticizers, polyols, fillers and other functional additives are charged into a high-intensity mixer to uniformly mix and disperse the ingredients. Vacuum is applied to the mixer to remove any residual moisture that may be introduced with the raw materials. Once this non-reactive pre-mix is below the defined moisture specification, the isocyanate, catalyst and other functional ingredients are then added to the mixer. The product is maintained at a target temperature of 160° F. for four hours to complete the reaction. Table 3 summarizes the process conditions and performance characteristics of the resultant product:

TABLE 3

| Parameter | Value |
| --- | --- |
| Reaction temperature | 160° F. |
| Viscosity | 191,000 Cps |
| Tensile strength[1] | 141 psi |
| Elongation[1] | 312% |
| Modulus[1] | 120 psi |
| Shore A hardness[1] | 42 |
| Lap shear strength[1] | 155 psi |

[1]All samples for mechanical testing were aged one week at room temperature

EXAMPLE 4

Polyurethane adhesive formulation 2 is produced using a continuous process on a twin-screw extruder by feeding the polyol preblend into the first barrel section of the mixer, followed immediately thereafter (within four screw diameters) by the Isocyanate(s). These two ingredients are mixed slightly while they are transported downstream using conveying elements. Within six screw diameters a preblend including a fraction of the catalyst is introduced to help drive the reaction in the first zone of the mixer. Shortly after the addition of the catalyst preblend, an alternating series of mixing and conveying elements are used to promote intimate mixing between the polyol, isocyanate and catalyst groups and promote the reaction. This mixing continues for between 5 to 15 screw diameters and ends with the introduction of an additive preblend (in this case consisting of a chemical desiccant, solvent and adhesion promoter). Conveying and mixing elements are again used to homogenize this material over a length of between 3 to 10 screw diameters. The mixing elements are followed by high-capacity conveying elements that are designed to convey a side-feed of solids entering the mixer at this point. A vent port is installed just upstream of this solids feed point, but there is no vacuum pressure applied. The purpose of the vent is to remove the gas entrained in the solid feed. Once the conveying elements have effectively removed the solids from the feed area, intensive mixing elements are employed over a length of 5 to 15 screw diameters. This is followed by a second vent port, where vacuum is applied for devolitization. Additional mixing elements are used over the subsequent 2 to 7 diameters before a preblend containing the remaining amount of catalyst is introduced. The screw configuration over the remainder of the mixing length (between 5 and 15 diameters) consists primarily of mixing elements prior to the discharge of the machine. Table 4 summarizes the process conditions and performance characteristics of the resultant product. Evaluation against the control data presented in Table 3 confirms comparable results across all performance measures.

TABLE 4

| Parameter | Value |
|---|---|
| Polyol feed location | 1 to 3 D |
| Isocyanate feed location | 3 to 7 D |
| Catalyst preblend 1 feed location | 6 to 13 D |
| Additive feed location | 16 to 30 D |
| Solids feed location | 25 to 40 D |
| Catalyst preblend 2 feed location | 35 to 45 D |
| Screw diameter | 50 mm |
| Screw L/D | 50 |
| Screw speed | 400 rpm |
| Throughput | 300 lb/hr |
| Upstream barrel temperature | 160° F. |
| Viscosity | 250,000 Cps |
| Tensile strength[1] | 147 psi |
| Elongation[1] | 338% |
| Modulus[1] | 124 psi |
| Shore A hardness[1] | 46 |
| Lap shear strength[1] | 163 psi |

[1]All samples for mechanical testing were aged one week at room temperature

EXAMPLE 5

Polyurethane adhesive formulation 2 is produced using a continuous process in accordance with the present invention on a twin-screw extruder using the same procedure outlined in Example 4 except that no catalyst is added in the first zone of the mixer. Instead, the catalyst preblend located after the second vent port introduces all of the catalyst. This simplifies the feed configuration and reduces the amount of associated equipment. Table 5 summarizes the process conditions and performance characteristics of the resultant product:

TABLE 5

| Parameter | Value |
|---|---|
| Polyol feed location | 1 to 3 D |
| Isocyanate feed location | 3 to 5 D |
| Additive feed location | 16 to 30 D |
| Solids feed location | 25 to 40 D |
| Catalyst preblend feed location | 35 to 45 D |
| Screw diameter | 50 mm |
| Screw L/D | 50 |
| Screw speed | 500 rpm |
| Throughput | 500 lb/hr |
| Upstream barrel temperature | 160° F. |
| Viscosity | 210,000 Cps |
| Tensile strength[1] | 150 psi |
| Elongation[1] | 302% |
| Modulus[1] | 136 psi |
| Shore A hardness[1] | 45 |
| Lap shear strength[1] | 151 psi |

[1]All samples for mechanical testing were aged one week at room temperature

EXAMPLE 6

Product from any of the previous examples may be further processed through a thin-film evaporator in order to remove additional entrained gas and/or moisture. In this example, the polyurethane formulation 2 is circulated through a Versator as supplied by the Cornell Machinery Company and we are testing the gas removal efficiency as measured by the product density. The results are summarized in Table 6:

TABLE 6

| Parameter | Value |
|---|---|
| Versator model | D-26LH |
| Rotational speed | approx. 1600 rpm |
| Throughput | 12,915 lb/hr |
| Inlet product temperature | 120° F. |
| Outlet product temperature | 126-128° F. |
| Inlet product density | 11.85 lb/gal |
| Outlet product density | 12.30 lb/gal |
| Density increase/gas removal efficiency | 3.8% |

EXAMPLE 7

Once again we are using a thin-film evaporator (the same Versator as outlined above), in this case to demonstrate moisture removal through a thin-film evaporator as measured by the water content in the product. The results are summarized in Table 7:

TABLE 7

| Parameter | Value |
|---|---|
| Versator model | D-26LH |
| Rotational speed | approx. 1600 Rpm |
| Throughput | 6,550 lb/hr |
| Inlet product temperature | 120-128° F. |
| Outlet product temperature | 128-141° F. |
| Inlet product moisture content | 0.140% |
| Outlet product moisture content | 0.101% |
| Moisture reduction | 28.0% |

EXAMPLE 8

The feed configuration for the proposed invention can be simplified and associated capital equipment cost reduced if the catalyst feed is removed from the mixer in any of the examples 2 or 4 or 5 outlined above. This polyurethane formulation is then pumped through a series of static mixing elements. Slightly upstream of the static mixer a preblend of plasticizer with pigment (weight loading of 15-25%) and catalyst (weight loading of 15-25%) is injected into the flow stream of the polyurethane product at a weight loading between 0.5% to 2.0%. Homogeneous mixing of the pigment and catalyst are subjectively evaluated by visual analysis of the product's color uniformity as it exits the static mixer. A summary of the results from two experiments are summarized in Table 8:

TABLE 8

| Parameter | Experiment 1 | Experiment 2 |
|---|---|---|
| Product feed conditions: | | |
| Temperature: | 72 | 72° F. |
| Feed rate: | 200 | 200 lb/hr |
| Pump discharge pressure: | 50 | 80 psi |
| Pigment feed conditions: | | |
| Temperature: | 72 | 72° F. |
| Feed rate: | 1.9 | 1.9 lb/hr |
| Pump discharge pressure: | 70 | 80 psi |
| Static mixer conditions: | | |
| Size: | 1" | 1" |
| Number of elements: | 12 | 24 |
| Type of elements: | Helical | Helical |
| Inlet pressure: | 45 | 75 psi |
| Discharge pressure: | 20 | 30 psi |
| Mixing evaluation: | Fail | Pass |

I claim:

1. A process for the continuous manufacturing of moisture-curable polyurethane adhesives and sealants, comprising the following steps:
   feeding a polyol to an upstream section of a twin-screw extruder;
   feeding an isocyanate to the upstream section of said twin-screw extruder, such that the NCO/OH molar ratio of said isocyanate to said polyol ranges from 1.5 to 3.0;
   feeding a catalyst to said twin-screw extruder at a location downstream from said polyol and isocyanate;
   mixing said polyol, said isocyanate and said catalyst in said twin-screw extruder to homogenize the polyol, isocyanate and catalyst, and drive the polyurethane reaction and form a moisture-curable liquid polyurethane product;
   controlling flow of the polyurethane product from the extruder in response to extruder discharge pressure to thereby control the steps of feeding the polyol and feeding the isocyante to the extruder in order to maintain a constant extruder discharge pressure;
   transferring the moisture-curable liquid polyurethane product from said twin-screw extruder to a storage tank; and
   alternatively, either transferring the moisture-curable liquid polyurethane product from said storage tank to a packaging line, or re-circulating the moisture-curable liquid polyurethane product back to the storage tank.

2. The process of claim 1 comprising applying a vacuum at one or more locations of the extruder to remove unwanted gaseous components from the product.

3. The process of claim 1 comprising adding only a fraction of the catalyst to said twin-screw extruder after the polyol and isocyanate to accelerate the reaction in the upstream section of the extruder, and thereafter adding a remaining amount of catalyst at a separate downstream location.

4. The process of claim 1 comprising adding one or more solid ingredients to said twin-screw extruder after the polyol and isocyanate.

5. The process of claim 1 comprising controlling the steps of feeding the polyol and feeding the isocyanate by utilizing a gear pump responsive to the extruder discharge pressure and located downstream of the extruder.

6. The process of claim 1 comprising removing any unwanted gases from the product by utilizing a thin-film evaporator while re-circulating the moisture-curable liquid polyurethane product back to the storage tank.

7. The process of claim 1 comprising adding pigment to the moisture-curable liquid polyurethane product while transferring the moisture-curable polyurethane product from said storage tank to said packaging line, and utilizing a static mixer downstream of said storage tank to uniformly mix pigment into the moisture-curable liquid polyurethane product.

8. The process of claim 1 comprising adding catalyst to the moisture-curable liquid polyurethane product while transferring the moisture-curable polyurethane product from said storage tank to said packaging line, and utilizing a static mixer downstream of said storage tank to uniformly mix catalyst into the moisture-curable polyurethane product.

9. The process of claim 1 comprising simultaneously adding catalyst and pigment to the moisture-curable liquid polyurethane product while transferring the moisture-curable polyurethane product from said storage tank to said packaging line, and utilizing a static mixer downstream of said storage tank to uniformly mix said pigment and catalyst into the moisture-curable polyurethane product.

* * * * *